Figure 1:
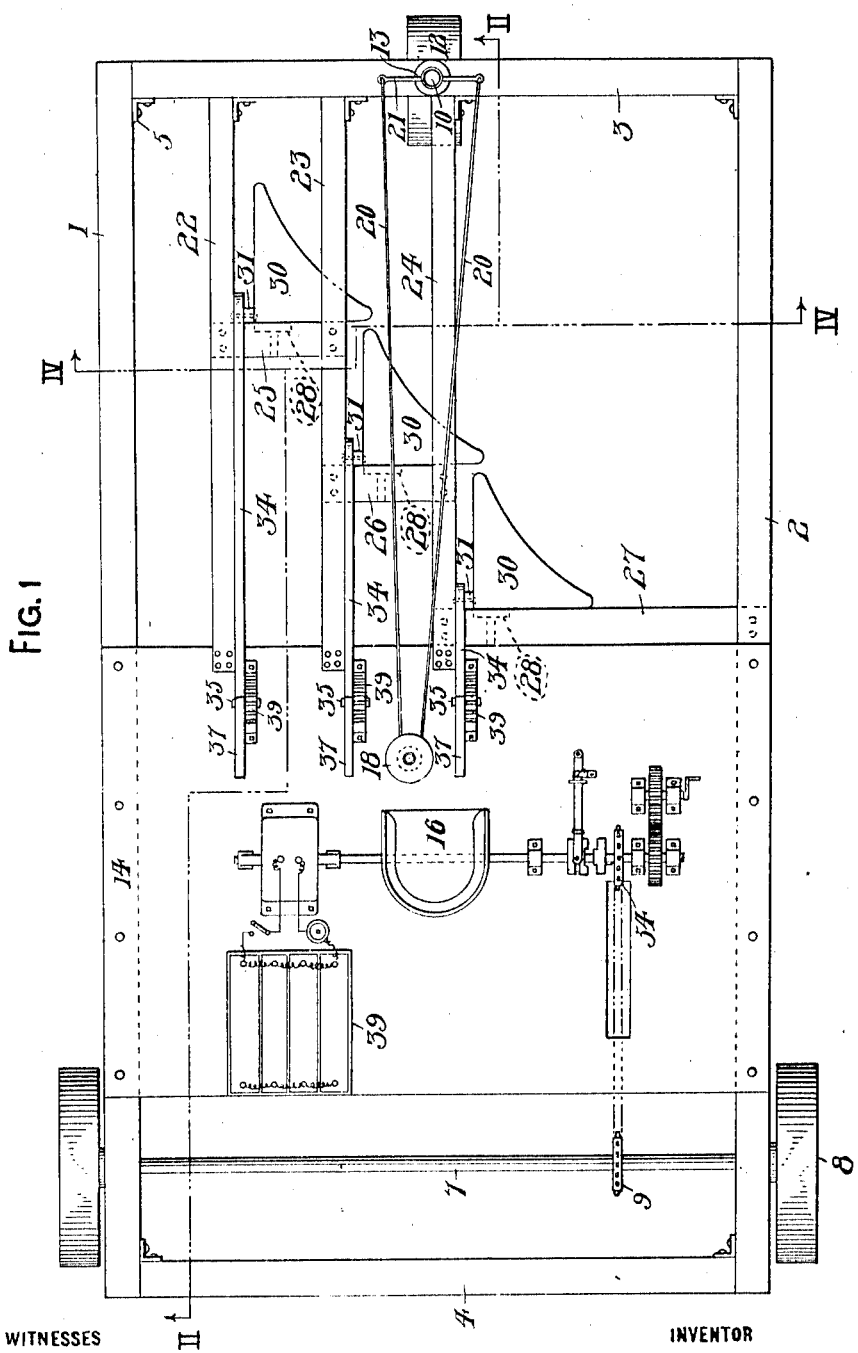

G. BORLAN.
AGRICULTURAL IMPLEMENT.
APPLICATION FILED NOV. 23, 1910.

1,012,321.

Patented Dec. 19, 1911.
2 SHEETS—SHEET 1.

WITNESSES

INVENTOR
George Borlan
By
Attorneys

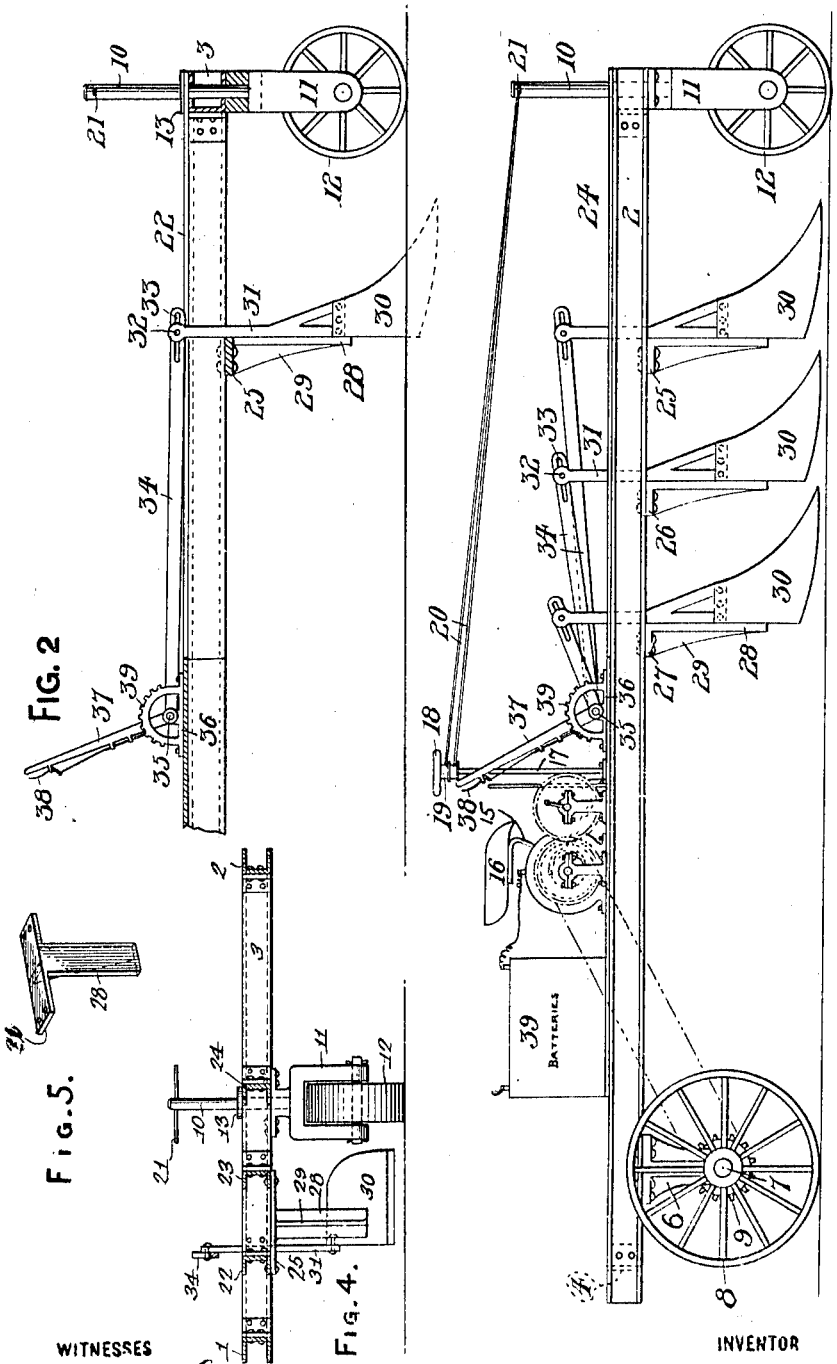

UNITED STATES PATENT OFFICE.

GEORGE BORLAN, OF McKEESPORT, PENNSYLVANIA.

AGRICULTURAL IMPLEMENT.

1,012,321. Specification of Letters Patent. Patented Dec. 19, 1911.

Application filed November 23, 1910. Serial No. 593,840.

*To all whom it may concern:*

Be it known that I, GEORGE BORLAN, a subject of the King of Hungary, residing at McKeesport, in the county of Allegheny and State of Pennsylvania, have invented certain new and useful Improvements in Agricultural Implements, of which the following is a specification, reference being had therein to the accompanying drawing.

This invention relates to agricultural implements and more particularly to plows for cultivating large areas of land, the plows being equipped with propulsion means whereby it will be unnecessary to employ animals to move the plow.

The primary object of my invention is to provide a plow that can be advantageously used in connection with large farms, especially in the Western States, where the fields are of a large size and where it would be almost impossible to cultivate the soil with a single bladed plow drawn by an animal.

Another object of this invention is to furnish an electrically propelled vehicle with a plurality of plow shares or blades for turning and cultivating a broad strip of soil as the vehicle is moved around the field.

A still further object of this invention is to provide an electrically operated plow with novel devices for controlling the operation of the same.

With these and such other objects in view as may hereinafter appear, the invention consists of the novel construction, combination, and arrangement of parts to be hereinafter specifically described and then claimed.

Reference will now be had to the drawings, wherein there is illustrated a preferred embodiment of the invention, but it is to be understood that the structural elements thereof are susceptible to such changes as fall within the scope of the appended claims.

In the drawings: Figure 1 is a plan of the implement. Fig. 2 is a fractional longitudinal sectional view taken on the line II—II of Fig. 1. Fig. 3 is a side elevation of the implement. Fig. 4 is a cross sectional view taken on the line IV—IV of Fig. 1. Fig. 5 is a perspective view of a detached brace for the plow shares.

Like numerals of reference designate corresponding parts throughout the several views.

1 and 2 denote longitudinal channel bars having the ends thereof connected to transverse channel bars 3 and 4 by angle brackets 5 arranged upon the inner sides of said channel bars. The channel bars 1 to 4 inclusive constitute the rectangular frame of the implement.

6 denotes hangers or depending bearings carried by the channel bars 1 and 2 adjacent to the rear ends thereof, and journaled in said hangers is a revoluble axle 7 having the ends thereof provided with wheels 8 having flat tires. Mounted upon the revoluble axle 7 is a sprocket wheel 9, the purpose of which will hereinafter appear.

10 denotes a rotatable post carried by the channel bar 3 intermediate the ends thereof, said post having the lower end thereof provided with a yoke 11 in which is revolubly mounted a steering wheel 12. The post 10 is provided with a collar 13 engaging the top of the bar 3, whereby the post and yoke cannot become accidentally displaced relatively to said bar.

14 denotes a platform connecting the bars 1 and 2 and located centrally of this platform is a support 15 for an operator's seat 16. In front of the operator's seat there is a post 17 having the upper end thereof provided with a revoluble steering wheel 18, and attached to the hub 19 of said wheel are cables 20 having the forward ends thereof connected to the ends of a cross-head 21 carried by the upper end of the post 10. The elements 10, 11, 12, 18, 19, and 20 constitute means for steering the implement over the ground.

22, 23, and 24 denote longitudinal channel bars connecting the forward edge of the platform 14 and the channel bar 3, the bars 22 being equally spaced and located to one side of the longitudinal axis of the implement frame. The bars 22 and 23 are connected by a brace 25, the bars 23 and 24 by a brace 26 and the bars 24 and 2 by a brace 27, these braces being arranged one in advance of the other, and each brace having a depending plow support 28 reinforced and strengthened by a web 29. Adapted to engage the supports 28 of the braces 25 to 27 inclusive are plows 30, each plow having a standard 31 loosely connected, as at 32, to the slotted end 33 of a rearwardly extending arm 34, said arms being fixed upon shafts 35 journaled in bearings 36 mounted upon the platform 14 at the forward edge thereof. Each shaft has an operating lever 37 provided with a locking lever 38 adapted to engage a segment rack 39 and hold the lever 37, shaft 35, arm 34, and the plow 30 thereof in an adjusted position, either raised or lowered. All of the operating levers 37 are within easy reach of the operator of the machine in the seat 16. The plow shares are suspended from the arms 34 and slide freely upon the braces 25, 26, and 27 of the supports 28. The braces 25 to 27 of the supports 28 brace the shares as the plows move forward and there would be very little lateral movement except when stones are encountered and then such movement might be to an advantage. The slight lateral movement as the shares move forward is retarded by the arms 34.

It will be observed that when the plows 30 are lowered and the implement is moved forward that such plows and the standards thereof are braced by the supports 28, and when any stone is encountered in the path of the plows, either plow can be raised to pass over the obstruction.

It is thought that the operation of steering and controlling the propelling mechanism of the implement will be apparent without further description, and I reserve the right to provide the standards 31 with different kinds of plow points, blades, or shares.

What I claim, is:

1. An agricultural implement comprising a portable rectangular frame, a platform secured thereto intermediate the ends thereof, a series of longitudinally-extending spaced bars secured at one end to said platform and having the other ends thereof secured to the forward end of said frame, transverse braces connecting said bars together, a transverse brace connecting one of said bars to one side of said frame, said braces arranged out of transverse alinement, a plow share support depending from each of said braces in proximity to one end thereof, plow shares arranged forwardly of and engaging said supports, a standard projecting upwardly from each of said shares and above said braces, shafts journaled upon said platform, a forwardly-extending arm projecting from each of said shafts, said arms being of different lengths, pin and slot connections between the forward ends of the arms and said standards, and means for rocking the shafts thereby shifting the arms and elevating and lowering said shares.

2. An agricultural implement comprising a portable frame, a platform secured thereto intermediate the end thereof, a plurality of longitudinally-extending spaced bars secured at one end to said platform and having their other end secured to the forward end of said frame, a transverse brace extending between a pair of said bars for connecting them together, a plow share support depending from said brace in proximity to one end thereof, a plow share arranged forwardly of and engaging said support, a standard projecting upwardly from said share and above said brace, a shaft journaled upon said platform, a forwardly-extending arm projecting from said shaft, a pin and slot connection between the forward end of the arm and said standard, and means for rocking the shaft thereby shifting the arm to elevate said share.

In testimony whereof I affix my signature in the presence of two witnesses.

GEORGE BORLAN.

Witnesses:
MAX H. SROLOVITZ,
CHRISTINA T. HOOD.